Nov. 6, 1962
R. H. McCORMICK
3,062,008
RECIPROCABLE-DRIVE MECHANISM
Filed Dec. 15, 1958
2 Sheets-Sheet 1
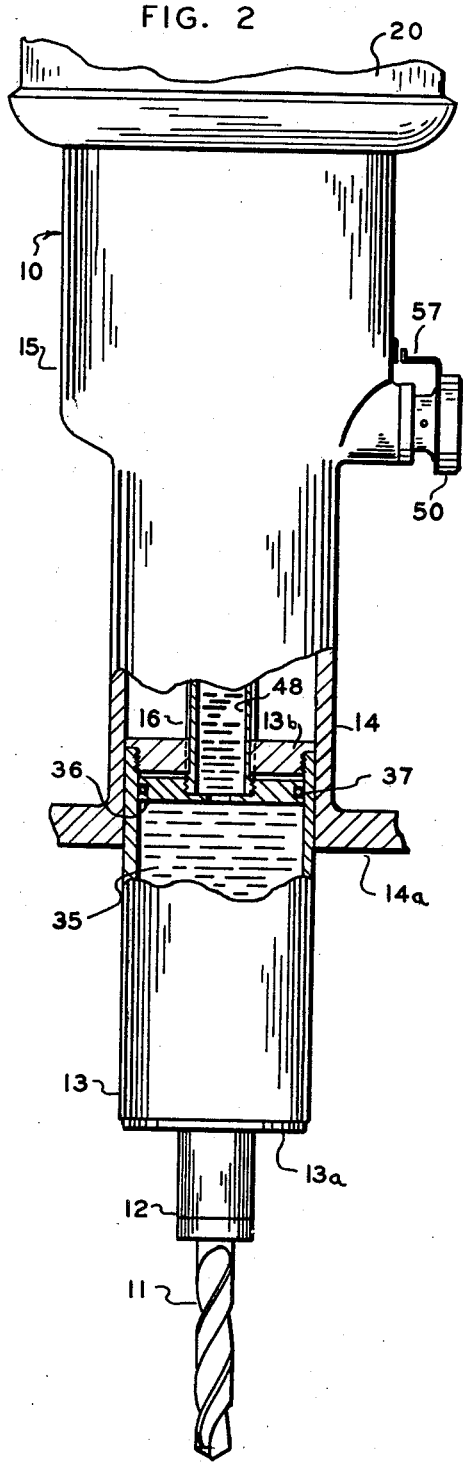
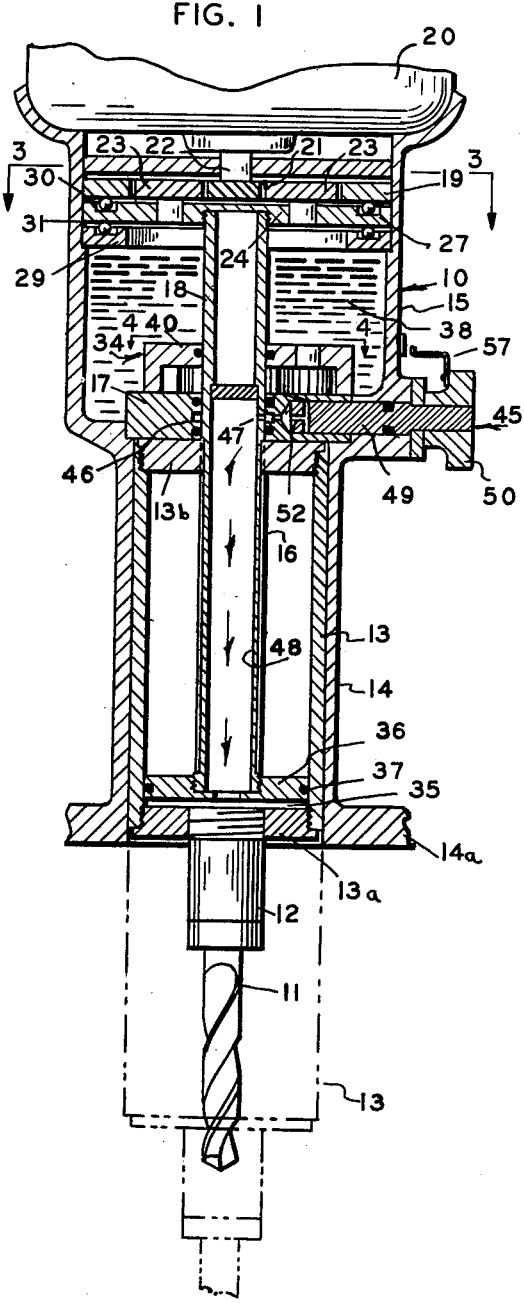
*INVENTOR.*
Rayna H. McCormick
BY
William Cleland
Attorney Nov. 6, 1962    R. H. McCORMICK    3,062,008
RECIPROCABLE-DRIVE MECHANISM
Filed Dec. 15, 1958    2 Sheets-Sheet 2

INVENTOR.
Rayna H. McCormick
BY William Cleland
Attorney

United States Patent Office 3,062,008
Patented Nov. 6, 1962

3,062,008
RECIPROCABLE-DRIVE MECHANISM
Rayna H. McCormick, Akron, Ohio, assignor to J-Dapter Company, Akron, Ohio, a corporation of Ohio
Filed Dec. 15, 1958, Ser. No. 780,630
2 Claims. (Cl. 60—52)

This invention relates to a reciprocable-drive mechanism, and in particular relates to a rotary drill having a reciprocable tool holder.

In the past, rotary power drills of the type used in machine shops, for example, have been provided with means for reciprocating the tool holder toward and from work mounted on a work-supporting table. Generally, however, such reciprocating means has comprised a manually operable mechanism including a worm screw device and rack and pinion, or has otherwise required use of bulky apparatus in addition to the usual rotary drive mechanism. Where the power drills were fully power operated the rotary drive means and the reciprocating means required independent driving or operating mechanisms, with consequent high cost of manufacture and maintenance of the equipment. Accordingly, such mechanisms were not readily adaptable for certain purposes, especially where compactness and ease of operation and cost of manufacturing were factors to be considered.

One object of the invention is to provide a reciprocable-drive mechanism of the character described, which is self-operating by rotation of a power driven tool-rotating part to reciprocate said rotary part toward and from work to be operated upon.

Another object of the invention is to provide a reciprocable-drive mechanism which is of simple, compact and efficient construction, and which, therefore, is economical to manufacture for a maximum number of uses, both old and new.

Another object of the invention is to provide a mechanism of the character described which obviates the necessity for provision of a separate power source to operate the reciprocating mechanism.

These and other objects of the invention will be manifest from the following brief description and the accompanying drawings.

Of the accompanying drawings:

FIGURE 1 is a front elevation, partly broken away and in section, of a reciprocable-drive mechanism utilized in a power drill and embodying the features of the invention, the drill and associated parts being shown in retracted condition.

FIGURE 2 is a view corresponding to FIGURE 1, but shown in full vertical cross-section and the drill and associated parts being shown in extended or work-engaging condition.

Figure 3:
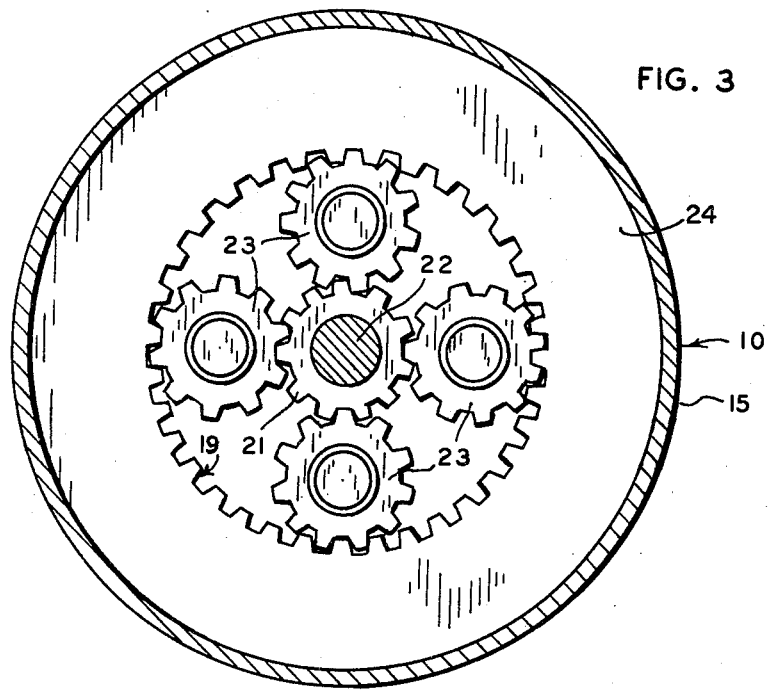
FIGURE 3 is an enlarged horizontal cross-section, taken substantially on a line 3—3 of FIGURE 1, and illustrating a speed-reducing drive for the mechanism.

Referring to the drawings generally, the numeral 10 designates a reciprocable-drive unit adapted to be mounted on a relatively fixed frame (not shown) of a machine, such as the bowling ball drilling machine shown in applicant's co-pending patent application, Serial No. 744,130, filed June 24, 1958, and which issued into Patent No. 2,948,168, on August 9, 1960. The unit 10, however, is suitable for use on other types of machines where a reciprocating rotary tool is required. It may be utilized, for example, on a conventional drill press.

In the present instance the tool is a twist drill 11, removably secured in a holder or chuck 12 affixed on a lower end wall 13a of a closed elongated cylinder 13, which is rotatably and axially slidably received in a cylindrical down extension 14 of a housing 15. For rotating the cylinder 13, an upper end wall 13b thereof is keyed or splined on an elongated driven shaft 16, which is journalled in a fluid-sealing bearing member 17, affixed in the housing 15 at the upper end of cylinder 13, the shaft 16 being rotatable but axially non-shiftable with respect to the bearing member and the housing. For driving shaft 16, an upward extension 18 thereof may be connected, through a planetary gear type of speed changer 19, to an electric motor 20 secured on the upper end of the housing 15.

As best shown in FIGURES 1 and 3, the speed changer 19 includes a driving gear 21, keyed on a driving shaft 22 of motor 20, to mesh with a plurality of gears 23, 23 which in turn mesh with an internal gear 24, non-rotatably secured to the housing 15. The speed changer also includes a disc 27, keyed on the upper end of the driven shaft extension 18, the gears 23 being rotatably carried by a disc 27 which is supported between the fixed gear 24 and a bearing 29 affixed in housing 15. The driven disc is rotatable on oppositely disposed free-running bearing means 30 and 31, and the arrangement is such that the motor in driving shaft 22 will through the small gears 23, internal gear 24, and driven disc 27, rotate shaft 16 at requisite slower speed.

For reciprocating the drill 11 toward and from the work (not shown), mounted on the upper side of the bearing 17, and within the housing 15, may be gear pump 34 adapted to pump pressure fluid, such as oil, to a space 35 between cylinder end wall 13a and an axially fixed plunger 36, which is secured to the lower end of shaft 16 to rotate therewith. Plunger 36 is fluid-sealed with respect to the cylinder wall, as by an elastic O-ring 37. The gear pump receives oil from a supply 38 thereof in housing 15, which constitutes a reservoir, through an inlet orifice 39 in the pump housing 40, and oil pressure is attained by passage of oil between a pair of meshing gears 42 and 43, rotated in opposite directions within a pump chamber 44, by rotation of shaft 16 to which one gear 42 is keyed. Pressure fluid from chamber 44 may be selectively supplied through a manually or otherwise controlled valve 45, to an annular chamber 46 in bearing 17 and communicating with an orifice 47 in shaft 16, to a passage 48 in shaft 16 which opens to said space 35, thereby to urge the cylinder 13 downwardly of the axially fixed plunger 36, to the relative position of the drill 11 and cylinder 13 shown in full lines in FIGURE 2, and in chain-dotted lines in FIGURE 1.

Figure 4:
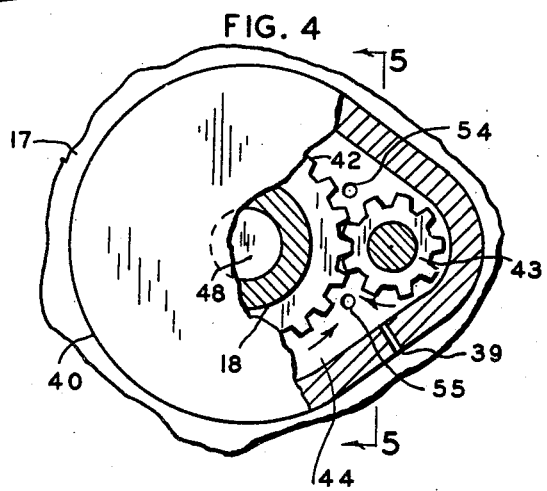
FIGURE 4 is an enlarged horizontal cross-section, taken substantially on the line 4—4 of FIGURE 2, and illustrating a gear pump utilized for reciprocation of the drill and associated parts.
Figure 5:
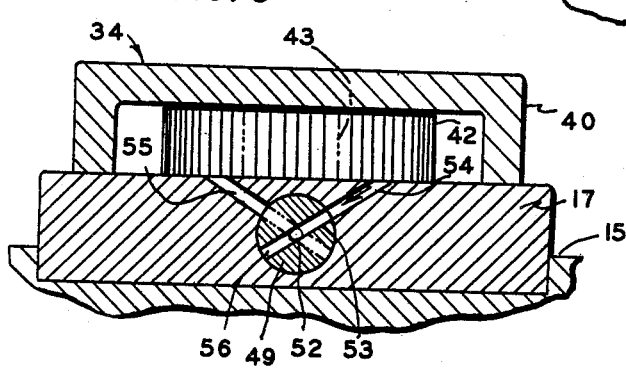
FIGURE 5 is a vertical cross-section taken substantially on the line 5—5 of FIGURE 4.

The valve 45 may include a stem 49, manually rotatable in bearing 17 by an outwardly exposed knob 50. In the pressure-applying position of valve stem 49 shown in FIGURES 1, 4 and 5, a central passage 52 at the inner end of the stem is in constant communication with annular chamber 46, and a radial passage 53 from said central passage connects with pressure side of the pump through a passage 54 in bearing 17. In this condition, a passage 55 in bearing 17, to the vacuum side of the gear is closed by the stem 49. The cylinder may be stopped short of the fully extended stroke thereof best shown in FIGURE 1, by turning knob 50 to a cylinder holding position of valve 45 in which both of the passages 54 and 55 are closed.

When it is desired to return the cylinder 13 and drill 11 to the retracted position shown in full lines in FIGURE 2, the valve stem 49 is turned, by means of knob 50, so that passage 52 opens to the vacuum side of the pump through a radial passage 56 in the valve stem and passage 55 (see chain-dotted lines in FIGURE 5), whereby the oil in the expanded space 35 is drawn upwardly by vacuum or suction, through passages 48 and 47, chamber 46 and passages 52, 56, and 55, and into said vacuum side of the pump, from where the excess oil flows through passage 39 into the oil reservoir within housing 15. Suitable indexing means 57 may be provided on knob 50 on housing 15, to indicate the position of valve stem 49 in extreme retracted and fully extended positions, and also a cylinder-holding position referred to above in which the cylinder is stopped intermediate said extreme positions.

In use of the improved drive mechanism 10 it is mounted in known manner, as by means of supporting portions 14a on the housing extension 14, on either a fixed or a movable part of an existing machine, such as the bowling ball drilling machine of the aforementioned co-pending patent application. Accordingly, the drill 11, in the retracted position of FIGURE 1, will be positioned at a predetermined distance above the work to be drilled, and at desired angle at which a hole is to be drilled. In this position the valve 45 will be in the neutral position described above.

With motor 20 operating to drive shaft 16 through the change speed mechanism 19, the drill 11 will be rotated with cylinder 13, splined on said shaft. Now, the operator turns the knob 50 to set the valve stem 49 to direct pressure fluid from the pump to the space 35 between plunger 36 and cylinder end wall 13a, thereby to urge the cylinder downwardly to fully extended position as shown in full lines in FIGURE 2 and in chain-dotted lines in FIGURE 1. Thus, the drill 11 is reciprocated to drill a hole in work to predetermined depth, by use of a single source of power, namely the motor 20, the reciprocating movement of the cylinder 13 being self-operating through rotation of the shaft 16 to operate the pump.

At the end of the drilling stroke, the valve stem 49 is turned, manually or otherwise, to reverse flow of fluid from space 35 by vacuum, as previously described, thereby to return the cylinder 13 and drill 11 to the full-line, FIGURE 1 position.

Modifications of the invention may be resorted to without departing from the spirit thereof or the scope of the appended claims.

What is claimed is:

1. A reciprocable-drive mechanism, comprising a relatively fixedly supported housing having a fluid-containing compartment therein and a hollow cylindrical wall opening axially downwardly of the compartment, a closed hollow member rotatably and axially shiftably received within said cylindrical wall, a plunger mounted within said hollow member to have the member axially relatively shiftable with respect thereto, said plunger providing a fluid-containing space between the same and a closed end of said hollow member, an electric motor mounted on said housing above said compartment and having a driving shaft, a driven element mounted in said housing to rotate about said axis and in rotational driving connection with said member, change-speed gear means connected between said driven shaft and said element to rotate the same, said element having conduit means to said fluid-containing space in various positions of rotational movement of the element, gear-pump means mounted in said relatively fixed housing to be operated by said driven element and having a pressure side and a vacuum side, valve means for communicating said conduit means with one or other of said pressure and vacuum sides of said gear pump, respectively to pump fluid from said compartment to said fluid-containing space and to return the fluid to the compartment by vacuum action, and thereby axially to reciprocate said hollow member relatively of said plunger, and a downwardly presented work-cutting tool mounted with respect to said hollow member and said plunger to be axially reciprocable and rotatable thereby.

2. A reciprocable-drive mechanism, comprising a relatively fixedly supported housing having a fluid-containing compartment therein and a hollow cylindrical wall opening axially downwardly of the compartment, a closed hollow member rotatably and axially shiftably received within said cylindrical wall, a plunger affixed on said element within said hollow member to have the member axially relatively shiftable with respect thereto, said plunger providing a fluid-containing space between the same and the outer end of said hollow member, an electric motor mounted on said housing above said compartment and having a driving shaft, a driven element mounted in said housing to rotate about said axis and in rotational driving connection with said member, change-speed gear means connected between said driven shaft and said element to rotate the same, said element having conduit means to said fluid-containing space in various positions of rotational movement of the element, gear-pump means mounted in said relatively fixed housing, to be operated by said driven element and having a pressure side and a vacuum side, valve means for communicating said conduit means with one or other of said pressure and vacuum sides of said gear pump, respectively to pump fluid from said compartment to said fluid-containing space and to return to the compartment by vacuum action, and thereby axially to reciprocate said hollow member relatively of said plunger, and work-cutting means mounted on the lower end of said hollow member to be axially shiftable and rotatable thereby.

References Cited in the file of this patent

UNITED STATES PATENTS

| | | |
|---|---|---|
| 1,700,468 | Clutter et al. | Jan. 29, 1929 |
| 2,196,208 | Gardiner | Apr. 9, 1940 |
| 2,374,764 | Mathys | May 1, 1945 |
| 2,643,555 | Steibel | June 30, 1953 |
| 2,819,589 | Geyer | Jan. 14, 1958 |
| 2,901,928 | Heyer | Sept. 1, 1959 |

FOREIGN PATENTS

| | | |
|---|---|---|
| 552,551 | Italy | Dec. 6, 1956 |